United States Patent
Yada et al.

(10) Patent No.: US 8,795,902 B2
(45) Date of Patent: Aug. 5, 2014

(54) SOLID ELECTROLYTE MATERIAL, LITHIUM BATTERY, AND METHOD OF PRODUCING SOLID ELECTROLYTE MATERIAL

(75) Inventors: Chihiro Yada, Susono (JP); Hiroshi Suyama, Mishima (JP); Shoji Yokoishi, Mishima (JP); Brian Elliot Hayden, Hampshire (GB); Thierry Le Gall, Southampton (GB); Duncan Clifford Alan Smith, Southampton (GB); Christopher Edward Lee, Southampton (GB)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/386,167

(22) PCT Filed: Apr. 13, 2010

(86) PCT No.: PCT/JP2010/056607
§ 371 (c)(1),
(2), (4) Date: Jan. 20, 2012

(87) PCT Pub. No.: WO2011/128979
PCT Pub. Date: Oct. 20, 2011

(65) Prior Publication Data
US 2013/0022878 A1  Jan. 24, 2013

(51) Int. Cl.
*H01M 10/0562* (2010.01)
(52) U.S. Cl.
USPC ............ 429/319; 429/304; 429/320

(58) Field of Classification Search
USPC .............................. 429/320, 304, 319
See application file for complete search history.

(56) References Cited

U.S. PATENT DOCUMENTS

| | | | |
|---|---|---|---|
| 2007/0148553 A1 | 6/2007 | Weppner | |
| 2012/0237835 A1 | 9/2012 | Yada et al. | |
| 2013/0071756 A1 | 3/2013 | Yada et al. | |
| 2013/0071757 A1 | 3/2013 | Yada et al. | |

FOREIGN PATENT DOCUMENTS

| | | |
|---|---|---|
| JP | 6-333577 | 12/1994 |
| JP | 9-219215 | 8/1997 |
| JP | 11-79746 | 3/1999 |
| JP | 2007-528108 | 10/2007 |
| JP | 2008-59843 | 3/2008 |

(Continued)

OTHER PUBLICATIONS

Machine Translation of JP 11-079746.*

(Continued)

*Primary Examiner* — Jonathan Jelsma
(74) *Attorney, Agent, or Firm* — Finnegan, Henderson, Farabow, Garrett & Dunner, LLP

(57) ABSTRACT

A main object of the present invention is to provide a solid electrolyte material having excellent Li ion conductivity. To attain the object, the present invention provides a solid electrolyte material represented by a general formula: $Li_x(La_{1-a}M1_a)_y(Ti_{1-b}M2_b)_zO_\delta$, wherein "x", "y", and "z" satisfy relations of $x+y+z=1$, $0.850 \leq x/(x+y+z) \leq 0.930$, and $0.087 \leq y/(y+z) \leq 0.115$; "a" is $0 \leq a \leq 1$; "b" is $0 \leq b \leq 1$; "$\delta$" is $0.8 \leq \delta \leq 1.2$; "M1" is at least one selected from the group consisting of Sr, Na, Nd, Pr, Sm, Gd, Dy, Y, Eu, Tb, and Ba; and "M2" is at least one selected from the group consisting of Mg, W, Mn, Al, Ge, Ru, Nb, Ta, Co, Zr, Hf, Fe, Cr, and Ga.

11 Claims, 5 Drawing Sheets

(56) References Cited

FOREIGN PATENT DOCUMENTS

| | | |
|---|---|---|
| JP | 2009-238704 | 10/2009 |
| JP | 2010-45019 | 2/2010 |
| JP | 2011-222415 | 11/2011 |
| WO | WO 2011/128976 | 10/2011 |
| WO | WO 2011/128977 | 10/2011 |
| WO | WO 2011/128978 | 10/2011 |

OTHER PUBLICATIONS

Machine Translation of JP 2009-238704.*
International Search Report in International Application No. PCT/JP2010/056607; Mailing Date: Aug. 3, 2010.

* cited by examiner

SOLID ELECTROLYTE MATERIAL, LITHIUM BATTERY, AND METHOD OF PRODUCING SOLID ELECTROLYTE MATERIAL

CROSS-REFERENCE TO RELATED APPLICATIONS

This application is a national phase application of International Application No. PCT/JP2010/056607, filed Apr. 13, 2010, the contents of which are incorporated herein by reference.

TECHNICAL FIELD

The present invention relates to a solid electrolyte material having excellent Li ion conductivity.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

An Li—La—Ti—O-based solid electrolyte material (LLT) has been known as a solid electrolyte material used for an all solid state lithium battery. For example, Patent Literature 1 discloses a solid electrolyte membrane having lithium ion conductivity, in which the solid electrolyte membrane has a composition of $La_xLi_yTi_zO_3$ ($0.4 \leq X \leq 0.6$, $0.4 \leq Y \leq 0.6$, $0.8 \leq Z \leq 1.2$, Y<X) and is an amorphous structure.

Further, Patent Literature 2 discloses a solid electrolyte layer composed of a solid electrolyte made of a complex oxide containing Li, La and Ti, in which the solid electrolyte layer has an amorphous layer, a crystalline layer and a lattice defective layer. In addition, in Patent Literature 2, it is described that the composition of a solid electrolyte material is preferably $La_{2/3-x}Li_{3x}TiO_3$ ($0.03 \leq x \leq 0.167$). This solid electrolyte material is synthesized by performing planetary ball milling and burning, and corresponds to the so-called bulk body, not a thin membrane.

Further, Patent Literature 3 discloses a perovskite type complex oxide represented by $Li_xLa_yTi_zO_3$ (x, y, z satisfy $0.08 \leq x \leq 0.75$, $0.8 \leq z \leq 1.2$, $x+3y+4z=6$, respectively). Further, in Examples of Patent Literature 4, a lithium ion conductor represented by $Li_{0.34}La_{0.51}TiO_{2.94}$ is disclosed. Further, in Examples of Patent Literature 5, a perovskite type oxide represented by $Li_{0.26}La_{0.57}TiO_3$ is disclosed.

CITATION LIST

Patent Literature

Patent Literature 1: Japanese Patent Application Publication Laid-Open (JP-A) No. 2009-238704
Patent Literature 2: JP-A No. 2008-059843
Patent Literature 3: JP-A No. H11-079746
Patent Literature 4: JP-A No. H06-333577
Patent Literature 5: JP-A No. H09-219215

SUMMARY OF INVENTION

Technical Problem

A solid electrolyte material having excellent Li ion conductivity has been demanded from the viewpoint of achieving higher output of a battery. The present invention has been made in view of the above-mentioned actual circumstances, and a main object thereof is to provide a solid electrolyte material having excellent Li ion conductivity.

Solution to Problem

To attain the object, the present invention provides a solid electrolyte material represented by a general formula: $Li_x(La_{1-a}M1_a)_y(Ti_{1-b}M2_b)_zO_\delta$, characterized in that "x", "y", and "z" satisfy relations of $x+y+z=1$, $0.850 \leq x/(x+y+z) \leq 0.930$, and $0.087 \leq y/(y+z) \leq 0.115$; "a" is $0 \leq a \leq 1$; "b" is $0 \leq b \leq 1$; "δ" is $0.8 \leq \delta \leq 1.2$; "M1" is at least one selected from the group consisting of Sr, Na, Nd, Pr, Sm, Gd, Dy, Y, Eu, Tb, and Ba; and "M2" is at least one selected from the group consisting of Mg, W, Mn, Al, Ge, Ru, Nb, Ta, Co, Zr, Hf, Fe, Cr, and Ga.

A solid electrolyte material having excellent Li ion conductivity may be obtained for the reason that the present invention has the above-mentioned general formula. The solid electrolyte material of the present invention has so high lithium content as to have the advantage that carrier concentration for contributing to Li ion conduction is high.

In the above-mentioned present invention, the solid electrolyte material preferably shows peaks in an X-ray diffraction measurement using CuKα where 2θ=22°, 27°, 34°, 35°. The reason therefor is that these peaks are conceived to derive from a crystal phase of high Li ion conductivity.

In the above-mentioned present invention, the solid electrolyte material is preferably in thin film form. The reason therefor is that the minute solid electrolyte material may be obtained and Li ion conductivity may be improved.

In the above-mentioned present invention, the solid electrolyte material preferably has a thickness of 200 nm to 5 μm.

In the above-mentioned present invention, the "a" and the "b" are preferably 0.

Further, the present invention provides a lithium battery comprising: a cathode active material layer containing a cathode active material, an anode active material layer containing an anode active material, and a solid electrolyte layer formed between the cathode active material layer and the anode active material layer, characterized in that the solid electrolyte layer contains the above-mentioned solid electrolyte material.

According to the present invention, the use of the above-mentioned solid electrolyte material allows a high-output lithium battery.

Further, the present invention provides a method of producing a solid electrolyte material comprising steps of: preparing a raw material, in which the raw material is made of Li, La, Ti, M1 (M1 being at least one selected from the group consisting of Sr, Na, Nd, Pr, Sm, Gd, Dy, Y, Eu, Tb, and Ba), and M2 (M2 being at least one selected from the group consisting of Mg, W, Mn, Al, Ge, Ru, Nb, Ta, Co, Zr, Hf, Fe, Cr, and Ga); and forming a thin film, in which the solid electrolyte material is formed using the raw material to a substrate by a reactive deposition method using oxygen, and the solid electrolyte material is represented by a general formula: $Li_x(La_{1-a}M1_a)_y(Ti_{1-b}M2_b)_zO_\delta$, characterized in that "x", "y", and "z" satisfy relations of x+y+z=1, $0.850 \leq x/(x+y+z) \leq 0.930$, and $0.087 \leq y/(y+z) \leq 0.115$; "a" is $0 \leq a \leq 1$; "b" is $0 \leq b \leq 1$; "δ" is $0.8 \leq \delta \leq 1.2$.

According to the present invention, the use of the reactive deposition method allows a minute thin film to be formed, and a solid electrolyte material having excellent Li ion conductivity may be obtained by the above-mentioned general formula.

In the above-mentioned present invention, the solid electrolyte material preferably shows peaks in an X-ray diffraction measurement using CuKα where 2θ=22°, 27°, 34°, 35°. The reason therefor is that these peaks are conceived to derive from a crystal phase of high Li ion conductivity.

In the above-mentioned present invention, the solid electrolyte material preferably has a thickness of 200 nm to 5 μm. The reason therefor is that the minute solid electrolyte material may be obtained and Li ion conductivity may be improved.

In the above-mentioned present invention, the solid electrolyte material is preferably formed in the thin film forming step by the reactive deposition method using an oxygen plasma.

In the above-mentioned present invention, the substrate is preferably a member containing a cathode active material layer or an anode active material layer. The reason therefor is to be useful for producing a lithium battery.

Advantageous Effects of Invention

The present invention produces the effect such as to allow a solid electrolyte material having excellent Li ion conductivity.

DESCRIPTION OF EMBODIMENTS

A solid electrolyte material, a lithium battery and a method of producing a solid electrolyte material of the present invention are hereinafter described in detail.

A. Solid Electrolyte Material

A solid electrolyte material of the present invention is first described. A solid electrolyte material of the present invention is represented by a general formula: $Li_x(La_{1-a}M1_a)_y(Ti_{1-b}M2_b)_zO_\delta$, characterized in that "x", "y", and "z" satisfy relations of x+y+z=1, $0.850 \leq x/(x+y+z) \leq 0.930$, and $0.087 \leq y/(y+z) \leq 0.115$; "a" is $0 \leq a \leq 1$; "b" is $0 \leq b \leq 1$; "δ" is $0.8 \leq \delta \leq 1.2$; "M1" is at least one selected from the group consisting of Sr, Na, Nd, Pr, Sm, Gd, Dy, Y, Eu, Tb, and Ba; and "M2" is at least one selected from the group consisting of Mg, W, Mn, Al, Ge, Ru, Nb, Ta, Co, Zr, Hf, Fe, Cr, and Ga.

A solid electrolyte material having excellent Li ion conductivity may be obtained for the reason that the present invention has the above-mentioned general formula. It has been conventionally known that a solid electrolyte material having a perovskite type structure, such as $La_{2/3-x}Li_{3x}TiO_3$, has high Li ion conductivity. However, with regard to a compound such as $La_{2/3-x}Li_{3x}TiO_3$, the problem is that lithium content in the compound is so low that carrier concentration for contributing to Li ion conduction is low and consequently sufficient Li ion conductivity may not be obtained. On the contrary, a solid electrolyte material of the present invention has so high lithium content as to have the advantage that Li ion conductivity is high.

Figure 1:
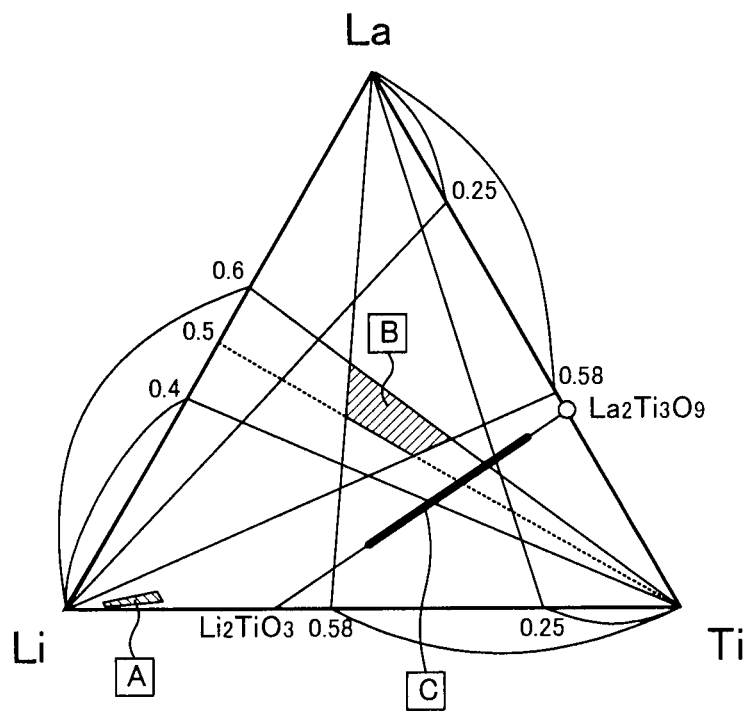
FIG. 1 is a ternary view explaining a solid electrolyte material of the present invention.

FIG. 1 is a ternary view explaining a solid electrolyte material of the present invention. With regard to a solid electrolyte material of the present invention, as shown in the above-mentioned general formula, part or all of La and part or all of Ti may be substituted with other metals (M1, M2); yet, in FIG. 1, the case where the solid electrolyte material is an Li—La—Ti—O-based solid electrolyte material is described for convenience. A solid electrolyte material of the present invention is shown by the area A in FIG. 1. On the other hand, the solid electrolyte material described in Patent Literature 1 has a composition shown by the area B in FIG. 1 when numerical ranges of x, y, and z are shown in the ternary view. Similarly, the solid electrolyte material described in Patent Literature 2 has a composition shown by the line segment C in FIG. 1. The composition area (the area A) in the present invention differs completely from the composition areas shown by the area B and the line segment C.

A solid electrolyte material of the present invention is represented by a general formula: $Li_x(La_{1-a}M1_a)_y (Ti_{1-b}M2_b)_z O_\delta$. In the above-mentioned general formula, "x", "y", and "z" satisfy relations of $0.850 \leq x/(x+y+z) \leq 0.930$, and $0.087 \leq y/(y+z) \leq 0.115$.

Further, in the above-mentioned general formula, "a" is $0 \leq a \leq 1$, and preferably $0 \leq a \leq 0.5$. Similarly, in the above-mentioned general formula, "b" is $0 \leq b \leq 1$, and preferably $0 \leq b \leq 0.5$. In the present invention, "a" or "b" may be 0, and "a" and "b" may be 0.

Further, in the above-mentioned general formula, "δ" is $0.8 \leq \delta \leq 1.2$. In consideration of valences of metallic elements included in the above-mentioned general formula, the value of δ may be specified by the electroneutrality principle; yet, oxygen deficiency and oxygen excess may be actually caused. Thus, in the present invention, the range of δ is prescribed at 0.8≤δ≤1.2 in consideration of oxygen deficiency and oxygen excess.

Further, in the above-mentioned general formula, "M1" is a metal capable of being located at the same site as La in a crystal structure; specifically, at least one selected from the group consisting of Sr, Na, Nd, Pr, Sm, Gd, Dy, Y, Eu, Tb, and Ba.

Further, in the above-mentioned general formula, "M2" is a metal capable of being located at the same site as Ti in a crystal structure; specifically, at least one selected from the group consisting of Mg, W, Mn, Al, Ge, Ru, Nb, Ta, Co, Zr, Hf, Fe, Cr, and Ga.

A solid electrolyte material of the present invention may be amorphous or crystalline. The case of being amorphous has the advantage that resistance increase in a grain boundary may be prevented. On the other hand, the case of being crystalline has the advantage that Li ion conductivity in a crystal grain is high. In addition, in the present invention, the use of the after-mentioned reactive deposition method allows crystal grains to be favorably joined to each other and allows resistance increase in a grain boundary to be restrained even in the case of being crystalline.

Further, a solid electrolyte material of the present invention preferably shows peaks in an X-ray diffraction measurement using CuKα where 2θ=22°, 27°, 34°, 35°. The reason therefor is that these peaks are conceived to derive from a crystal phase of high Li ion conductivity. This crystal phase does not belong to a conventional perovskite type structure, as described in the after-mentioned Examples.

Further, a solid electrolyte material of the present invention may be bulky or in thin film form, and preferably in thin film form. The reason therefor is that the use of the after-mentioned reactive deposition method allows a minute solid electrolyte material to be obtained and allows Li ion conductivity to be improved.

The size of a solid electrolyte material of the present invention is not particularly limited. Above all, in the case where a solid electrolyte material of the present invention is in thin film form, the thickness of the thin film is preferably 200 nm or more, more preferably 500 nm or more, and far more preferably 800 nm or more. On the other hand, the thickness of the thin film is preferably 5 μm or less, more preferably 3 μm or less, and far more preferably 2 μm or less.

A solid electrolyte material of the present invention may be used for optional uses in which Li ion conductivity is required. Examples of the uses of the solid electrolyte material include batteries such as a lithium battery and sensors such as a gas sensor. A method of producing a solid electrolyte material of the present invention is described in detail in the after-mentioned "C. Method of producing solid electrolyte material". A solid electrolyte material in a bulk body may be produced by using a mechanical milling method and a solid phase method, for example.

B. Lithium Battery

Next, a lithium battery of the present invention is described. A lithium battery of the present invention is a lithium battery comprising: a cathode active material layer containing a cathode active material, an anode active material layer containing an anode active material, and a solid electrolyte layer formed between the cathode active material layer and the anode active material layer, characterized in that the solid electrolyte layer contains the above-mentioned solid electrolyte material.

According to the present invention, the use of the above-mentioned solid electrolyte material allows a high-output lithium battery.

Figure 2:
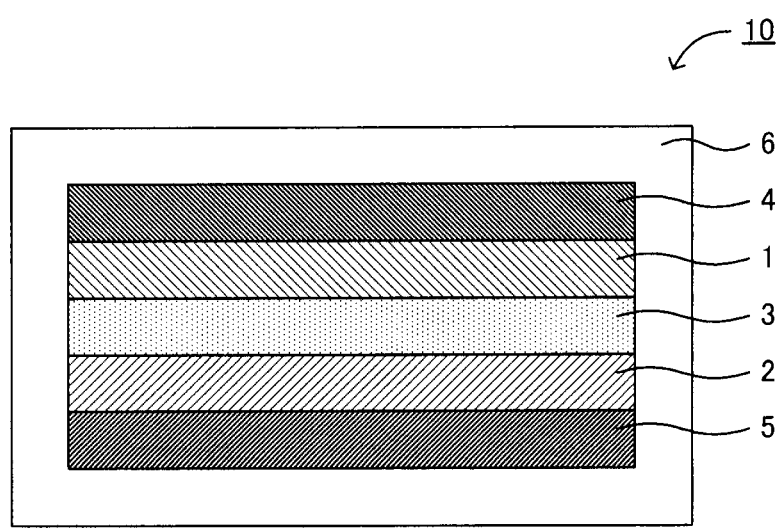
FIG. 2 is a schematic cross-sectional view showing an example of a lithium battery of the present invention.

FIG. 2 is a schematic cross-sectional view showing an example of a lithium battery of the present invention. A lithium battery 10 in FIG. 2 comprises: a cathode active material layer 1 containing a cathode active material, an anode active material layer 2 containing an anode active material, a solid electrolyte layer 3 formed between the cathode active material layer 1 and the anode active material layer 2, a cathode current collector 4 for performing current collecting of the cathode active material layer 1, an anode current collector 5 for performing current collecting of the anode active material layer 2, and a battery case 6 for storing these members. The present invention is greatly characterized in that the solid electrolyte layer 3 contains the solid electrolyte material described in the above-mentioned "A. Solid electrolyte material".

A lithium battery of the present invention is hereinafter described in each constitution.

1. Solid Electrolyte Layer

A solid electrolyte layer in the present invention is first described. A solid electrolyte layer in the present invention contains the above-mentioned solid electrolyte material. The range of the thickness of the solid electrolyte layer is preferably the same as the range of the thickness of the above-mentioned solid electrolyte material.

2. Cathode Active Material Layer

Next, a cathode active material layer in the present invention is described. A cathode active material layer in the present invention is a layer containing at least a cathode active material, and may contain at least one of a conductive material, a solid electrolyte material and a binder, as required. Examples of the cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$.

A cathode active material layer in the present invention may further contain a conductive material. The addition of the conductive material allows conductivity of the cathode active material layer to be improved. Examples of the conductive material include acetylene black, Ketjen Black and carbon fiber. Further, the cathode active material layer may further contain a solid electrolyte material. The addition of the solid electrolyte material allows Li ion conductivity of the cathode active material layer to be improved. Examples of the solid electrolyte material include an oxide solid electrolyte material and a sulfide solid electrolyte material. Further, the cathode active material layer may further contain a binder. Examples of the binder include a fluorine-containing binder such as polytetrafluoroethylene (PTFE). The thickness of the cathode active material layer is preferably within a range of 0.1 μm to 1000 μm, for example.

3. Anode Active Material Layer

Next, an anode active material layer in the present invention is described. An anode active material layer in the present invention is a layer containing at least an anode active material, and may contain at least one of a conductive material, a solid electrolyte material and a binder, as required. Examples of the anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon.

A conductive material, a solid electrolyte material and a binder used for the anode active material layer are the same as the case of the above-mentioned cathode active material layer. The thickness of the anode active material layer is preferably within a range of 0.1 μm to 1000 μm, for example.

4. Other Constitutions

A lithium battery of the present invention has at least the above-mentioned solid electrolyte layer, cathode active material layer and anode active material layer; and generally further has a cathode current collector for performing current collecting of the cathode active material layer and an anode current collector for performing current collecting of the anode active material layer. Examples of a material for the cathode current collector include SUS, aluminum, nickel, iron, titanium and carbon, and preferably SUS among them. On the other hand, examples of a material for the anode current collector include SUS, copper, nickel and carbon, and preferably SUS among them. The factors such as thickness and shape of the cathode current collector and the anode current collector are preferably selected properly in accordance with usages of a lithium battery. A battery case of a general lithium battery may be used for a battery case used for the present invention. Examples of the battery case include a battery case made of SUS.

5. Lithium Battery

A lithium battery of the present invention may be a primary battery or a secondary battery, and preferably a secondary battery among them. The reason therefor is to be repeatedly chargeable and dischargeable and be useful as a car-mounted battery, for example. Examples of the shape of a lithium battery of the present invention include a coin shape, a laminate shape, a cylindrical shape and a rectangular shape. A method of producing a lithium battery of the present invention is not particularly limited if it is a method for allowing the above-mentioned lithium battery, and the same method as a method of producing a general lithium battery may be used. Examples thereof include a method such that a material composing a cathode active material layer, a material composing a solid electrolyte layer and a material composing an anode active material layer are sequentially pressed to thereby produce a power generating element and this power generating element is stored inside a battery case, which is crimped.

C. Method of Producing Solid Electrolyte Material

Next, a method of producing a solid electrolyte material of the present invention is described. A method of producing a solid electrolyte material of the present invention comprises steps of: preparing a raw material, in which the raw material is made of Li, La, Ti, M1 (M1 being at least one selected from the group consisting of Sr, Na, Nd, Pr, Sm, Gd, Dy, Y, Eu, Tb, and Ba), and M2 (M2 being at least one selected from the group consisting of Mg, W, Mn, Al, Ge, Ru, Nb, Ta, Co, Zr, Hf, Fe, Cr, and Ga); and forming a thin film, in which the solid electrolyte material is formed using the raw material to a substrate by a reactive deposition method using oxygen, and the solid electrolyte material is represented by a general formula: $Li_x(La_{1-a}M1_a)_y(Ti_{1-b}M2_b)_zO_\delta$, in which "x", "y", and "z" satisfy relations of x+y+z=1, $0.850 \leq x/(x+y+z) \leq 0.930$, and $0.087 \leq y/(y+z) \leq 0.115$; "a" is $0 \leq a \leq 1$; "b" is $0 \leq b \leq 1$; and "δ" is $0.8 \leq \delta \leq 1.2$.

According to the present invention, the use of the reactive deposition method allows a minute thin film to be formed, and a solid electrolyte material having excellent Li ion conductivity may be obtained by the above-mentioned general formula.

Figure 3:
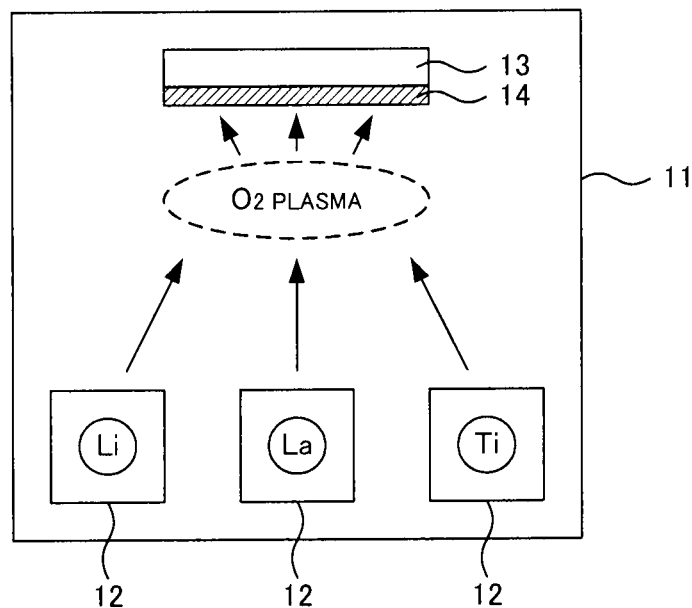
FIG. 3 is a schematic cross-sectional view showing an example of a method of producing a solid electrolyte material of the present invention.

FIG. 3 is a schematic cross-sectional view showing an example of a method of producing a solid electrolyte material of the present invention. In FIG. 3, a crucible 12 in which Li metal, La metal and Ti metal are put, and a substrate 13 are first placed in a chamber 11. Next, the pressure of the chamber 11 is reduced to form a vacuum state. Thereafter, $O_2$ plasma is caused to simultaneously volatilize Li metal, La metal and Ti metal by a resistance heating method and an electron beam method. Thus, an LiLaTiO thin film 14 is deposited on the substrate 13. A thin film with high amorphous nature is obtained if the substrate is not heated during the deposition, and a thin film with high crystallinity is obtained by heating the substrate during the deposition or post-heating a thin film deposited on the substrate.

A method of producing a solid electrolyte material of the present invention is hereinafter described at each step.

1. Step of Preparing Raw Material

A step of preparing a raw material in the present invention is first described. The step of preparing a raw material in the present invention is a step of preparing a raw material, in which the raw material is made of Li, La, Ti, M1 (M1 being at least one selected from the group consisting of Sr, Na, Nd, Pr, Sm, Gd, Dy, Y, Eu, Tb, and Ba), and M2 (M2 being at least one selected from the group consisting of Mg, W, Mn, Al, Ge, Ru, Nb, Ta, Co, Zr, Hf, Fe, Cr, and Ga).

In the present invention, elemental metals of Li, La, Ti, M1 and M2 are generally prepared. These elemental metals are preferably high in purity. The reason therefor is to allow a solid electrolyte material with fewer impurities. Further, generally, M1 is not used in the case of obtaining a solid electrolyte material such that "a" in the above-mentioned general formula is 0, and M2 is not used in the case of obtaining a solid electrolyte material such that "b" in the above-mentioned general formula is 0.

2. Step of Forming Thin Film

Next, a step of forming a thin film in the present invention is described. The step of forming a thin film in the present invention is a step of forming the above-mentioned solid electrolyte material while using the above-mentioned raw material to a substrate by a reactive deposition method using oxygen.

In the present invention, the solid electrolyte material is formed by a reactive deposition method. In this method, the thin-film solid electrolyte material is formed by volatilizing the raw material to react the volatilized raw material with oxygen. Examples of a method of volatilizing the raw material include a resistance heating method and an electron beam method. Examples of a method of reacting the volatilized raw material with oxygen include a method of using oxygen plasma and a method of using oxygen gas. In addition, in the present invention, the reactive deposition is preferably performed in vacuo, and is preferably performed specifically in a vacuum of $1 \times 10^{-10}$ mBar or less. The reason therefor is that a minute thin film may be formed. The thickness of the solid electrolyte material may be controlled by deposition time.

Further, in the present invention, the thin-film solid electrolyte material is formed on the substrate. The substrate in the present invention is not particularly limited and preferably selected properly in accordance with usages of the solid electrolyte material. For example, in the case of using the solid electrolyte material as a solid electrolyte layer of a lithium battery, a member having a cathode active material layer or an anode active material layer is preferably used as the substrate.

3. Others

A solid electrolyte material obtained by the present invention is the same as the contents described in the above-mentioned "A. Solid electrolyte material"; therefore, the description herein is omitted. The present invention may provide a solid electrolyte material characterized by being obtained by the above-mentioned method of producing a solid electrolyte material.

The present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

Lithium metal (ribbon, a purity of 99.9%, manufactured by Sigma-Aldrich Co. LLC.), lanthanum metal (a purity of 99.9%, manufactured by Sigma-Aldrich Co. LLC.), and titanium metal (slug, a purity of 99.98%, manufactured by Alfa Aesar®) were first prepared as a raw material. Next, the lithium metal was put in a 40 cm$^3$ crucible made of pyrolytic boron nitride (PBN) and placed in a chamber. Next, the lanthanum metal and the titanium metal were each put in a 40 cm$^3$ crucible made of pyrolytic graphite and placed in the chamber in the same manner. An Si/SiO$_2$/Ti/Pt laminated body (manufactured by NOVA Electronic Materials, LLC.) was used as a substrate, a deposition area was determined at 0.785 cm$^2$ (equivalent to φ 10 mm), and a distance from the raw material to the substrate was determined at 500 mm. Next, the inside of the chamber was subject to a high vacuum of 1×10$^{-10}$ mBar or less.

Thereafter, resistance heating (Knudsen Cells) was performed for the crucible in which the lithium metal was put to volatilize the lithium, and simultaneously electron beam irradiation was performed for the crucible in which the lanthanum metal was put and the crucible in which the titanium metal was put to volatilize the lanthanum metal and the titanium metal. Oxygen plasma was caused in the chamber by using an oxygen plasma generator (manufactured by Oxford Applied Research Ltd., RF source, HD25™) and reacted with the volatilized raw material to thereby obtain a thin-film solid electrolyte material on the substrate. The substrate was heated to a temperature of 700° C. during the deposition.

The thickness of the obtained solid electrolyte material was 390 nm. When ICP analysis (inductively coupled plasma analysis) was performed for the obtained solid electrolyte material, and a result of Li:La:Ti=85.3:1.5:13.2 was offered.

Examples 2 to 5 and Comparative Examples 1 and 2

Figure 4:
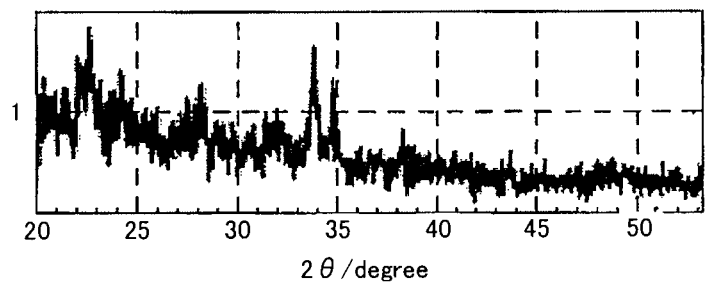
FIG. 4 is a result of XRD measurement of a solid electrolyte material obtained in Example 1.
Figure 5:
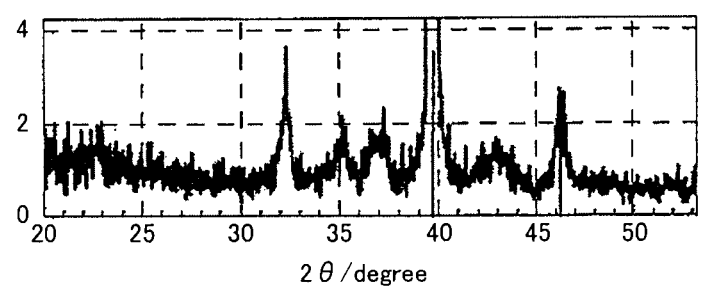
FIG. 5 is a result of XRD measurement of a solid electrolyte material obtained in Comparative Example 1.

A thin-film solid electrolyte material was each obtained in the same manner as Example 1 except for properly adjusting the amount of the metals volatilized from the crucible with a shutter. The compositions of the solid electrolyte materials obtained in Examples 2 to 5 and Comparative Examples 1 and 2 at a ratio of Li:La:Ti was as shown in the following table 1.
[Evaluation 1]
(1) X-Ray Diffraction Measurement XRD measurement using CuKα was performed for the solid electrolyte materials obtained in Example 1 and Comparative Example 1. The result is shown in FIGS. 4 and 5. As shown in FIG. 4, it was confirmed that the solid electrolyte material of Example 1 showed peaks where 2θ=22°, 27°, 34°, 35°. These peaks did not belong to a perovskite type structure known as an Li—La—Ti—O-based high ion conduction phase. Thus, it is conceived that the solid electrolyte material of Example 1 has a structure except the perovskite type structure. On the other hand, as shown in FIG. 5, it was confirmed that the solid electrolyte material of Comparative Example 1 showed great peaks where 2θ=32°, 39°, 46° and had Li$_2$TiO$_3$ and LiTi$_2$O$_4$ as main components through these peaks. Li$_2$TiO$_3$ and LiTi$_2$O$_4$ are known as compounds with low Li ion conductivity.
(2) Li Ion Conductivity Li ion conductivity of the solid electrolyte materials obtained in Examples 1 to 5 and Comparative Examples 1 and 2 was evaluated. Platinum was first deposited on the surface of the solid electrolyte material formed on the substrate to produce a symmetrical cell of Pt/solid electrolyte material/Pt. Next, an alternating current impedance method was performed at a temperature of 25° C. to calculate Li ion conductivity. The result is shown in table 1 and FIG. 6.

TABLE 1

|  | Li | La | Ti | Li/(Li + La + Ti) | La/(La + Ti) | log(σ ion/Scm$^{-1}$) |
|---|---|---|---|---|---|---|
| Example 1 | 85.3 | 1.5 | 13.2 | 0.853 | 0.102 | −3.87 |
| Example 2 | 86.3 | 1.4 | 12.3 | 0.863 | 0.102 | −3.39 |
| Example 3 | 88.4 | 1.2 | 10.4 | 0.884 | 0.103 | −3.20 |
| Example 4 | 91.6 | 0.9 | 7.5 | 0.916 | 0.107 | −3.01 |
| Example 5 | 93.0 | 0.7 | 6.3 | 0.930 | 0.100 | −3.74 |
| Comparative Example 1 | 84.4 | 1.6 | 14.0 | 0.844 | 0.103 | −6.28 |
| Comparative Example 2 | 93.6 | 0.7 | 5.8 | 0.935 | 0.108 | −5.56 |

Figure 6:
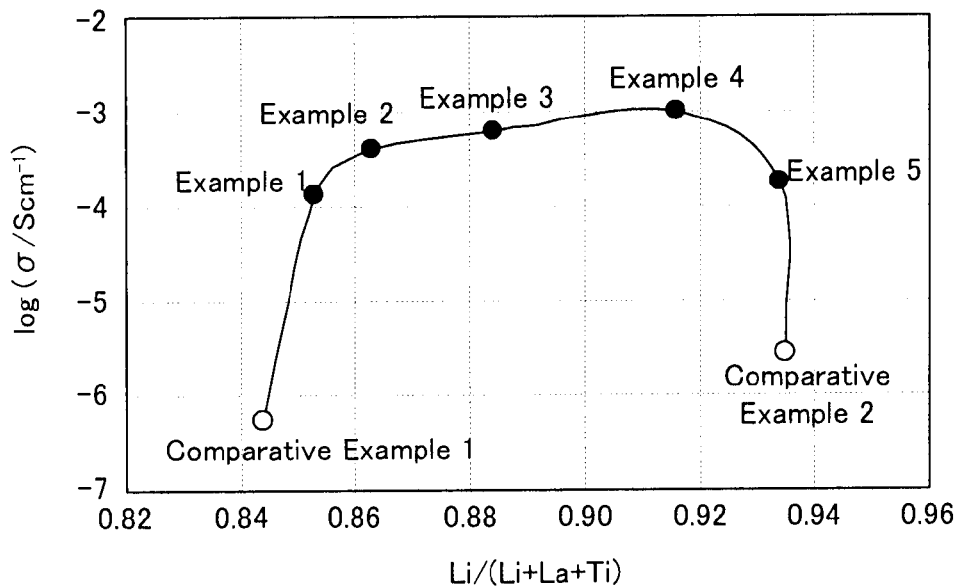
FIG. 6 is a result of measuring Li ion conductivity of solid electrolyte materials obtained in Examples 1 to 5 and Comparative Examples 1 and 2.
Figure 7:
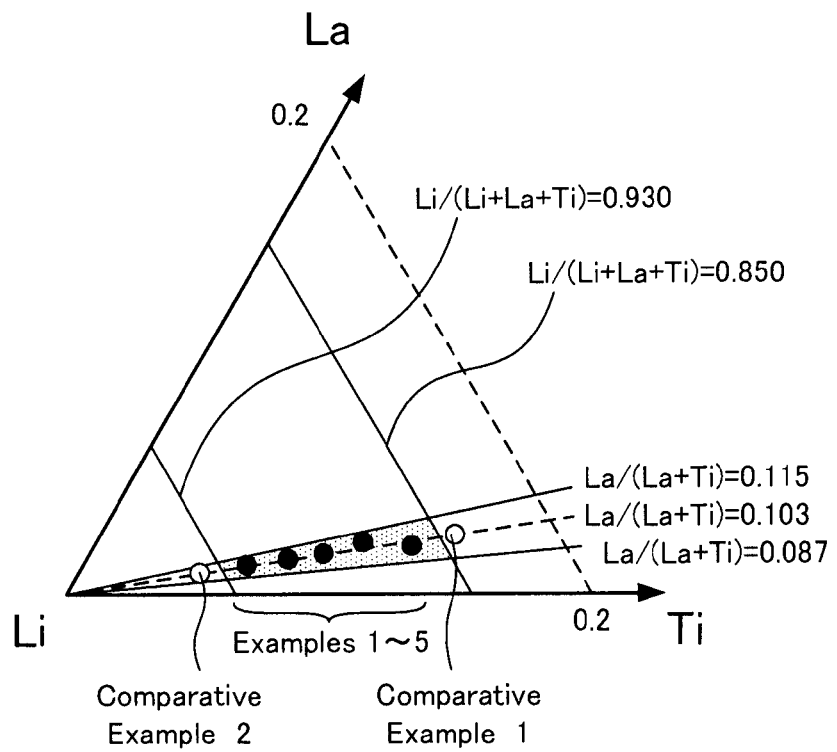
FIG. 7 is a ternary view explaining solid electrolyte materials obtained in Examples 1 to 5 and Comparative Examples 1 and 2.

As shown in table 1, Examples 1 to 5 and Comparative Examples 1 and 2 were all fixed in the vicinity of La/(La+Ti)= 0.103. Further, as shown in FIG. 6, Li ion conductivity was remarkably high in Examples 1 to 5 as compared with Comparative Examples 1 and 2. In addition, when the result of table 1 and FIG. 6 was represented by a ternary view, as shown in FIG. 7, it was confirmed that excellent Li ion conductivity was obtained when Li/(Li+La+Ti) satisfied 0.850≤Li/(Li+La+Ti)≤0.930.

Examples 6 to 9 and Comparative Examples 3 and 4

A thin-film solid electrolyte material was each obtained in the same manner as Example 1 except for properly adjusting the amount of the metals volatilized from the crucible with a shutter. The compositions of the solid electrolyte materials obtained in Examples 6 to 9 and Comparative Examples 3 and 4 at a ratio of Li:La:Ti were as shown in the following table 2.
[Evaluation 2]

Li ion conductivity of the solid electrolyte materials obtained in Examples 4, 6 to 9 and Comparative Examples 3 and 4 was evaluated. The evaluation method is the same as the above. The result is shown in table 2 and FIG. 8.

TABLE 2

|  | Li | La | Ti | Li/(Li + La + Ti) | La/(La + Ti) | log(σ ion/Scm$^{-1}$) |
|---|---|---|---|---|---|---|
| Example 4 | 91.6 | 0.9 | 7.5 | 0.916 | 0.107 | −3.01 |
| Example 6 | 91.5 | 0.8 | 7.7 | 0.915 | 0.094 | −4.01 |
| Example 7 | 91.4 | 0.8 | 7.8 | 0.914 | 0.093 | −3.89 |
| Example 8 | 91.8 | 0.9 | 7.3 | 0.918 | 0.110 | −3.64 |
| Example 9 | 91.3 | 1.0 | 7.7 | 0.913 | 0.115 | −3.35 |
| Comparative Example 3 | 91.6 | 0.6 | 7.8 | 0.916 | 0.071 | −6.39 |
| Comparative Example 4 | 91.5 | 1.0 | 7.5 | 0.915 | 0.118 | −5.95 |

Figure 8:
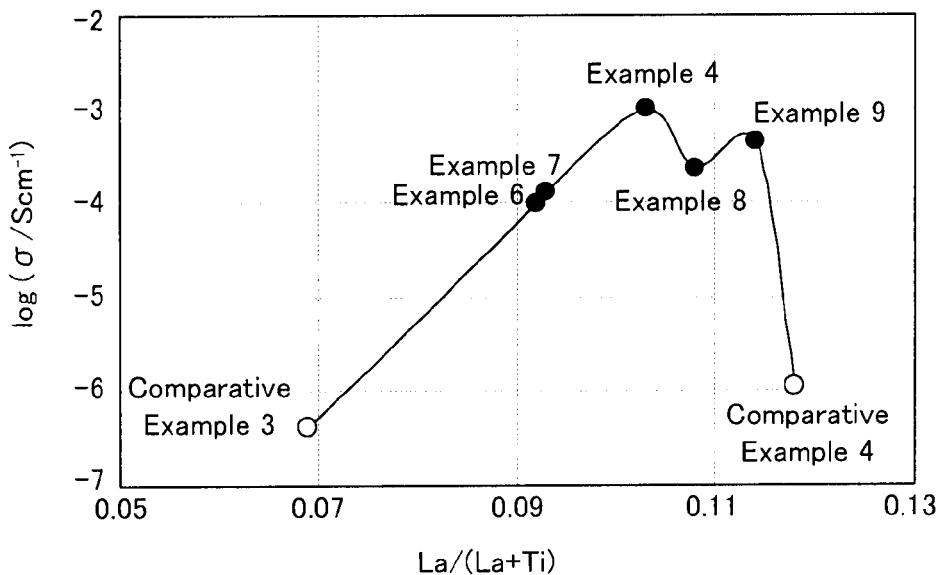
FIG. 8 is a result of measuring Li ion conductivity of solid electrolyte materials obtained in Examples 4, 6 to 9 and Comparative Examples 3 and 4.
Figure 9:
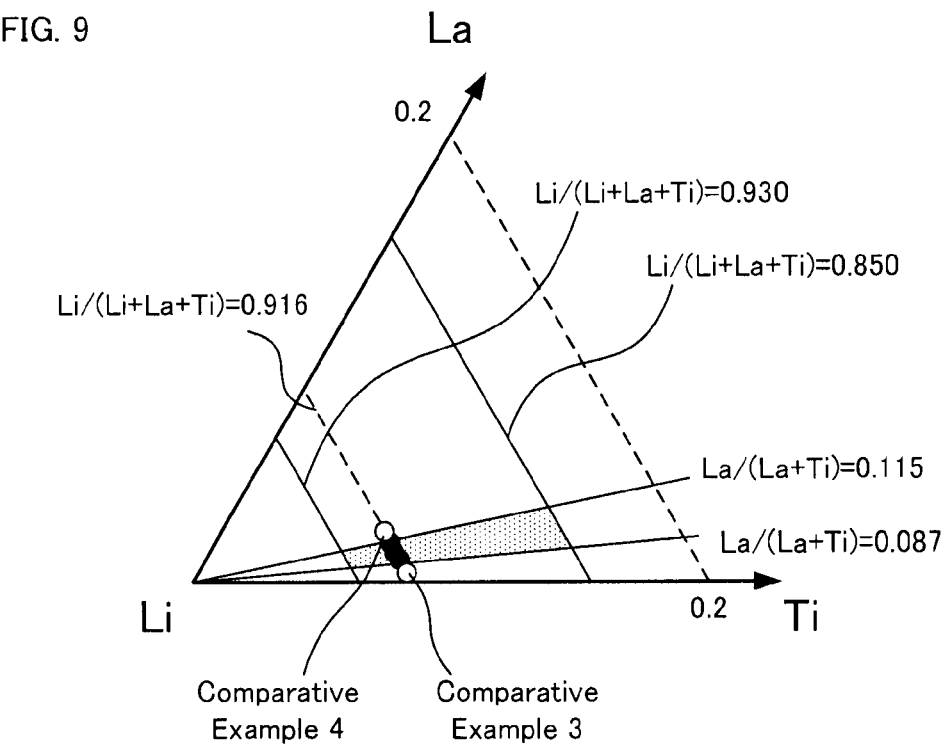
FIG. 9 is a ternary view explaining solid electrolyte materials obtained in Examples 4, 6 to 9 and Comparative Examples 3 and 4.

As shown in table 2, Examples 4, 6 to 9 and Comparative Examples 3 and 4 were all fixed in the vicinity of Li/(Li+La+Ti)=0.916. Further, as shown in FIG. 8, Li ion conductivity was remarkably high in Examples 4, 6 to 9 as compared with Comparative Examples 3 and 4. In addition, when the result of table 2 and FIG. 8 was represented by a ternary view, as shown in FIG. 9, it was confirmed that excellent Li ion conductivity was obtained when La/(La+Ti) satisfied 0.087≤La/(La+Ti)≤0.115.

Examples 10 to 15 and Comparative Examples 5 to 9

A thin-film solid electrolyte material was each obtained in the same manner as Example 1 except for properly adjusting the amount of the metals volatilized from the crucible with a shutter. The compositions of the solid electrolyte materials obtained in Examples 10 to 15 and Comparative Examples 5 to 9 at a ratio of Li:La:Ti were as shown in the following table 3.

[Evaluation 3]

Li ion conductivity of the solid electrolyte material obtained in Examples 10 to 15 and Comparative Examples 5 to 9 was evaluated. The evaluation method is the same as the above. The result is shown in table 3.

TABLE 3

| | Li | La | Ti | Li/(Li + La + Ti) | La/(La + Ti) | log(σ ion/Scm$^{-1}$) |
|---|---|---|---|---|---|---|
| Example 10 | 85.0 | 1.4 | 13.6 | 0.850 | 0.093 | −3.63 |
| Example 11 | 85.1 | 1.3 | 13.6 | 0.851 | 0.087 | −3.39 |
| Example 12 | 85.4 | 1.6 | 13.0 | 0.854 | 0.110 | −3.55 |
| Example 13 | 90.1 | 1.1 | 8.8 | 0.901 | 0.111 | −3.87 |
| Example 14 | 90.9 | 0.8 | 8.3 | 0.909 | 0.088 | −3.74 |
| Example 15 | 93.0 | 0.8 | 6.2 | 0.930 | 0.114 | −3.56 |
| Comparative Example 5 | 81.2 | 1.7 | 17.1 | 0.812 | 0.090 | −6.53 |
| Comparative Example 6 | 82.1 | 2.1 | 15.8 | 0.821 | 0.117 | −5.93 |
| Comparative Example 7 | 84.4 | 1.9 | 13.7 | 0.844 | 0.122 | −5.24 |
| Comparative Example 8 | 93.6 | 0.4 | 6.0 | 0.936 | 0.063 | −4.39 |
| Comparative Example 9 | 93.6 | 0.8 | 5.6 | 0.936 | 0.125 | −4.96 |

Figure 10:
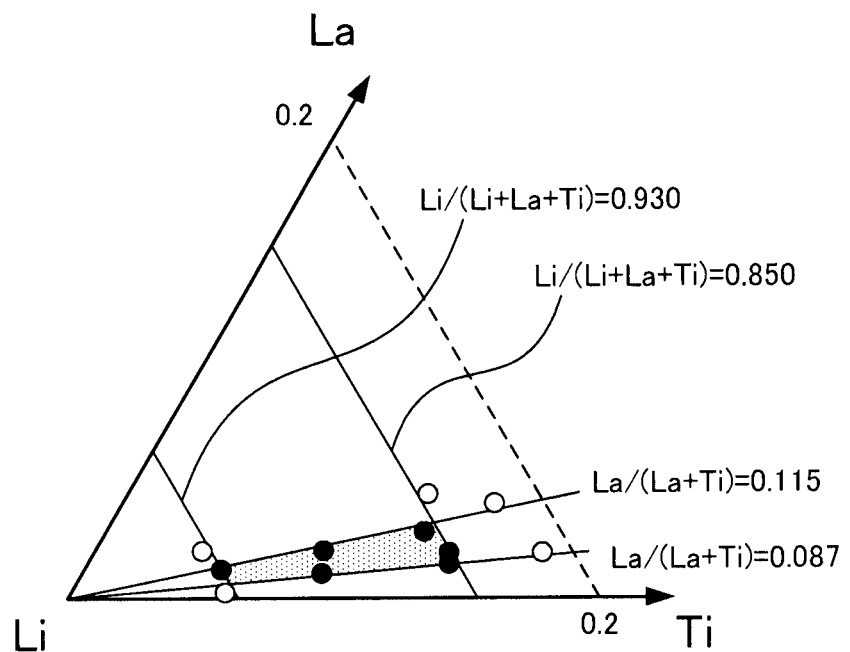
FIG. 10 is a ternary view explaining solid electrolyte materials obtained in Examples 10 to 15 and Comparative Examples 5 to 9.

As shown in table 3, Li ion conductivity was remarkably high in Examples 10 to 15 as compared with Comparative Examples 5 to 9. In addition, when the result of table 3 was represented by a ternary view, as shown in FIG. 10, it was confirmed that excellent Li ion conductivity was obtained when Li/(Li+La+Ti) satisfied 0.850≤Li/(Li+La+Ti)≤0.930 and La/(La+Ti) satisfied 0.087≤La/(La+Ti)≤0.115.

| | Reference Signs List |
|---|---|
| 1 | cathode active material layer |
| 2 | anode active material layer |
| 3 | solid electrolyte layer |
| 4 | cathode current collector |
| 5 | anode current collector |
| 6 | battery case |
| 10 | lithium battery |
| 11 | chamber |
| 12 | crucible |
| 13 | substrate |
| 14 | LiLaTiO thin film |

The invention claimed is:

1. A solid electrolyte material represented by a general formula:

$$Li_x(La_{1-a}M1_a)_y(Ti_{1-b}M2_b)_zO_\delta,$$

wherein "x", "y", and "z" satisfy relations of x+y+z=1, 0.850≤x/(x+y+z)≤0.930, and 0.087≤y/(y+z)≤0.115; "a" is 0≤a≤1; "b" is 0≤b≤1; "δ" is 0.8≤δ≤1.2; "M1" is at least one selected from the group consisting of Sr, Na, Nd, Pr, Sm, Gd, Dy, Y, Eu, Tb, and Ba; and "M2" is at least one selected from the group consisting of Mg, W, Mn, Al, Ge, Ru, Nb, Ta, Co, Zr, Hf, Fe, Cr, and Ga.

2. The solid electrolyte material according to claim 1, wherein the solid electrolyte material shows peaks in a X-ray diffraction measurement using CuKα where 2θ=22°, 27°, 34°, 35°.

3. The solid electrolyte material according to claim 1, wherein the solid electrolyte material is in thin film form.

4. The solid electrolyte material according to claim 1, wherein the solid electrolyte material has a thickness of 200 nm to 5 μm.

5. The solid electrolyte material according to claim 1, wherein the "a" and the "b" are 0.

6. A lithium battery comprising:
    a cathode active material layer containing a cathode active material,
    an anode active material layer containing an anode active material, and
    a solid electrolyte layer formed between the cathode active material layer and the anode active material layer,
    wherein the solid electrolyte layer contains the solid electrolyte material of claim 1.

7. A method of producing a solid electrolyte material comprising steps of:
    preparing a raw material, in which the raw material is made of Li, La, Ti, M1 (M1 being at least one selected from the group consisting of Sr, Na, Nd, Pr, Sm, Gd, Dy, Y, Eu, Tb, and Ba), and M2 (M2 being at least one selected from the group consisting of Mg, W, Mn, Al, Ge, Ru, Nb, Ta, Co, Zr, Hf, Fe, Cr, and Ga); and
    forming a thin film, in which a solid electrolyte material is formed using the raw material to a substrate by a reactive deposition method using oxygen, and the solid electrolyte material is represented by a general formula: $Li_x(La_{1-a}M1_a)_y(Ti_{1-b}M2_b)_zO_\delta$, in which "x", "y", and "z" satisfy relations of x+y+z=1, 0.850≤x/(x+y+z)≤0.930, and 0.087≤y/(y+z)≤0.115; "a" is 0≤a≤1; "b" is 0≤b≤1; and "δ" is 0.8≤δ≤1.2.

8. The method of producing a solid electrolyte material according to claim 7, wherein the solid electrolyte material shows peaks in a X-ray diffraction measurement using CuKα where 2θ=22°, 27°, 34°, 35°.

9. The method of producing a solid electrolyte material according to claim 7, wherein the solid electrolyte material has a thickness of 200 nm to 5 μm.

10. The method of producing a solid electrolyte material according to claim 7, wherein the solid electrolyte material is formed in the thin film forming step by the reactive deposition method using an oxygen plasma.

11. The method of producing a solid electrolyte material according to claim 7, wherein the substrate is a member containing a cathode active material layer or an anode active material layer.

* * * * *